United States Patent
Muller

(10) Patent No.: US 7,783,715 B2
(45) Date of Patent: Aug. 24, 2010

(54) SCHEDULED ELECTRONIC MAIL DELETIONS

(75) Inventor: Michael J. Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/198,390

(22) Filed: Aug. 26, 2008

(65) Prior Publication Data
US 2008/0313296 A1 Dec. 18, 2008

Related U.S. Application Data

(63) Continuation of application No. 10/734,437, filed on Dec. 12, 2003, now abandoned.

(51) Int. Cl.
*G06F 15/16* (2006.01)
(52) U.S. Cl. ..................... 709/206; 715/752
(58) Field of Classification Search ............ 709/206; 715/752
See application file for complete search history.

(56) References Cited

U.S. PATENT DOCUMENTS

| | | | | |
|---|---|---|---|---|
| 5,555,346 A * | 9/1996 | Gross et al. | ............... | 706/45 |
| 5,627,764 A * | 5/1997 | Schutzman et al. | ......... | 709/207 |
| 5,786,817 A * | 7/1998 | Sakano et al. | ............... | 345/619 |
| 6,934,738 B1 * | 8/2005 | Furusawa et al. | ........... | 709/206 |
| 7,020,132 B1 * | 3/2006 | Narasimhan et al. | ........ | 370/355 |
| 7,191,219 B2 * | 3/2007 | Udell et al. | ................ | 709/206 |
| 7,219,302 B1 * | 5/2007 | O'Shaughnessy et al. | ... | 715/752 |
| 7,356,564 B2 * | 4/2008 | Hartselle et al. | ............ | 709/206 |
| 7,415,465 B2 * | 8/2008 | Muller | ............................. | 1/1 |
| 2002/0023136 A1 * | 2/2002 | Silver et al. | ................. | 709/206 |
| 2002/0032742 A1 * | 3/2002 | Anderson | ................... | 709/206 |
| 2002/0052923 A1 * | 5/2002 | Anderson | ................... | 709/206 |
| 2002/0085034 A1 * | 7/2002 | Cortright | .................... | 345/764 |
| 2003/0081001 A1 * | 5/2003 | Munro | ...................... | 345/752 |
| 2003/0126215 A1 * | 7/2003 | Udell et al. | ................. | 709/206 |
| 2003/0131062 A1 * | 7/2003 | Miyashita | ................... | 709/206 |
| 2004/0141004 A1 * | 7/2004 | Cabezas et al. | ............ | 345/751 |
| 2004/0243942 A1 * | 12/2004 | Cortright | .................... | 715/769 |
| 2005/0144246 A1 * | 6/2005 | Malik | ......................... | 709/206 |
| 2007/0042792 A1 * | 2/2007 | Perfetto et al. | .............. | 455/461 |
| 2007/0233800 A1 * | 10/2007 | Knoerle et al. | ............. | 709/206 |
| 2007/0266107 A1 * | 11/2007 | Friend et al. | ................ | 709/206 |
| 2008/0281930 A1 * | 11/2008 | Hartselle et al. | ............ | 709/206 |
| 2009/0106370 A1 * | 4/2009 | Dreyfus et al. | .............. | 709/206 |

* cited by examiner

*Primary Examiner*—Douglas B Blair
(74) *Attorney, Agent, or Firm*—Guerin & Rodriguez, LLP; Michael A. Rodriguez

(57) ABSTRACT

A method of managing electronic mail messages in an email account includes displaying an open email message to a user on a display screen of a device. While the open email message is displayed to the user, intent of the user to perform an action that will result in closing the open email message is detected. In automatic response to detecting the intent of the user and before the action can be completed, a plurality of deletion options is presented to the user, from which the user selects one deletion option. A selection of one of the deletion options is received from the user. A deletion criterion is set for a given email message based on the selected deletion option and the action that will result in closing the open email message is completed, in automatic response to receiving the selection from the user.

2 Claims, 6 Drawing Sheets

SCHEDULED ELECTRONIC MAIL DELETIONS

CROSS-REFERENCE TO RELATED APPLICATION

This application is a continuation application claiming the benefit of the filing date of co-pending U.S. patent application Ser. No. 10/734,437, filed Dec. 12, 2003, titled "Scheduled Electronic Mail Deletions," the entirety of which U.S. patent application is incorporated by reference herein.

FIELD OF THE INVENTION

The invention relates generally to electronic mail systems. More particularly, the invention relates to a system and method of scheduling automatic deletions of electronic mail messages in a user's electronic mail account.

BACKGROUND

Electronic mail, or email, is a widespread, heavily used software tool for exchanging messages among users over a communications network, such as the Internet. Anyone with an email-enabled computing device, such as a desktop or laptop computer, workstation, personal digital assistant, or cell phone, with a wireless or wired connection to the network, can send email messages to the electronic mailboxes of others users similarly connected to the network. A typical business user can receive several hundred email messages in the course of a day. Moreover, users often save a copy of each self-generated mail message, whether that mail message is a newly composed mail message or a reply to or a forwarding of a received message. Unless proactively and regularly managed, users' mailboxes thus become cluttered with saved email messages, many of which have outlived their usefulness.

Disadvantages inherent to mailbox clutter are evident. Organizations need to spend more on their mail servers to maintain the large number of saved email messages and employees are less efficient when having to sort through many irrelevant emails. Notwithstanding such disadvantages, mailbox clutter still grows because users do not want to delete immediately email messages that may have some time-limited usefulness (e.g., until a scheduled meeting occurs with the email message sender). Many users, however, forget to delete these email messages after their period of usefulness has passed. Thus, there is a need for a system and method that can help email users reduce the clutter of email messages in their mailboxes and organizations manage costs for maintaining email accounts.

SUMMARY

In one aspect, the invention features a method of managing electronic mail (email) messages in an email account. An open email message is displayed to a user on a display screen of a device. While the open email message is displayed to the user, intent of the user to perform an action that will result in closing the open email message is detected. In automatic response to detecting the intent of the user and before the action can be completed, a plurality of deletion options is presented to the user, from which the user selects one deletion option. A selection of one of the deletion options is received from the user. A deletion criterion is set for a given email message based on the selected deletion option and the action that will result in closing the open email message is completed, in automatic response to receiving the selection from the user.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In general, the present invention provides users with a tool for managing electronic mail (email) messages in their email accounts. In brief overview, a user determines if and when email messages are to be deleted from an email account. Scheduled email deletions can be time-based or event-based. Time-based deletions cause email messages to be deleted at a specified time. Event-based deletions cause email messages to be deleted on the occurrence of a particular event. A user assigns a deletion criterion to an email message, whether time-based or event based, upon closing that email message. Accordingly, email messages are subsequently and automatically removed from a user's email account, at the scheduled time or upon the occurrence of the event, without any further intervention by the user, thus helping reduce the clutter of email messages in the user's email account and the amount of computing resources needed for storing email messages.

Figure 1:
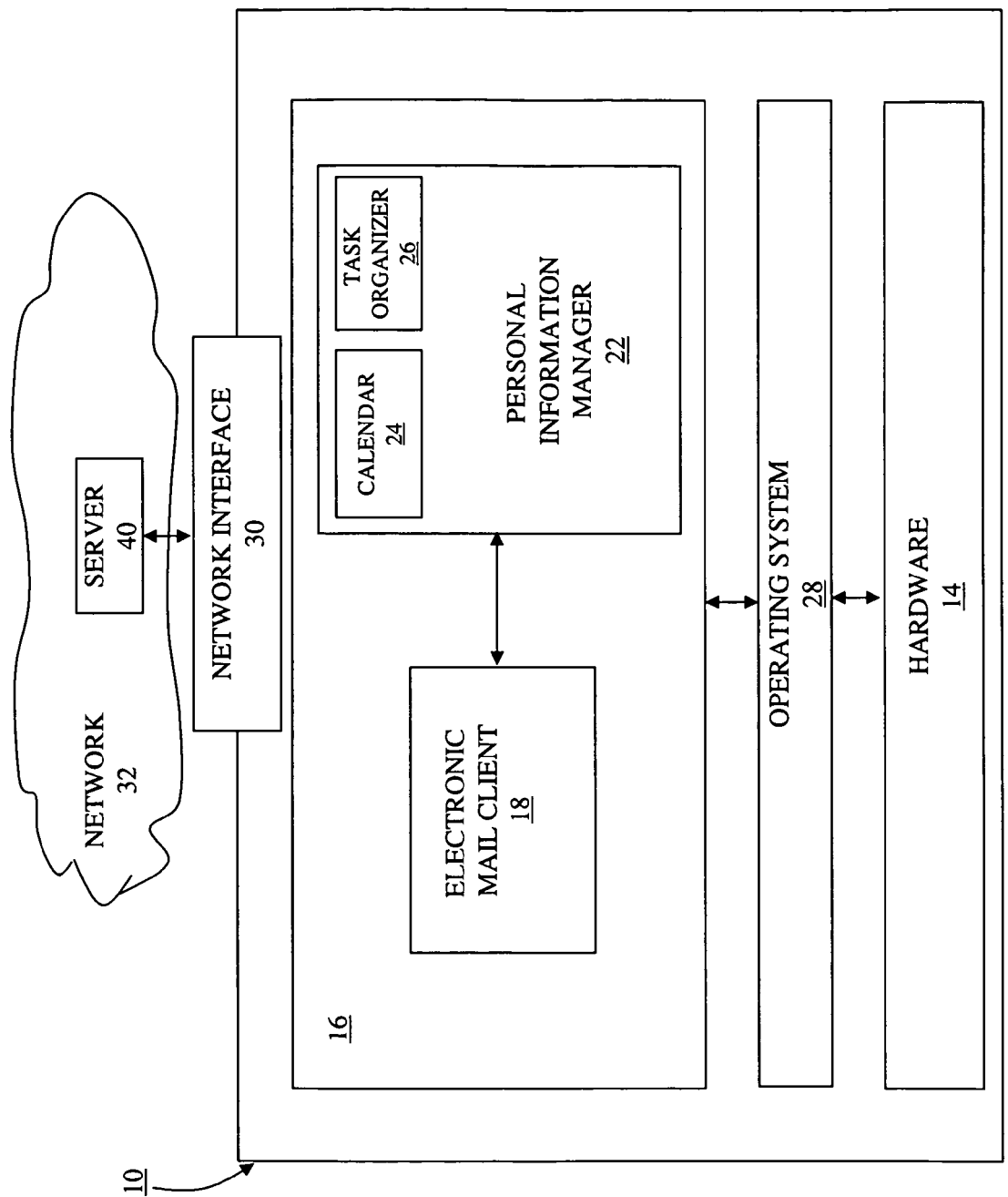
FIG. 1 is a block diagram of an embodiment of a client system constructed in accordance with the invention.

FIG. 1 shows an embodiment of a client system 10 constructed in accordance with the invention. The client system 10 can be any personal computer (e.g., 286, 386, 486, Pentium, Pentium II, Macintosh computer), Windows-based terminal, Network Computer, wireless device, information appliance, RISC Power PC, X-device, workstation, minicomputer, mainframe computer, cell phone, personal digital assistant (PDA) or other computing device that has hardware 14 such as a display screen, one or more input devices (e.g., keypad, stylus, keyboard, mouse, touch-pad, and trackball), a processor for executing application programs 16, and sufficient persistent storage for storing such application programs and related information. One such application program 16 is an electronic mail client program 18 of the invention.

The email client program 18 can be any proprietary or commercially available email program, such as Lotus NOTES™ and Microsoft OUTLOOK™, modified to support scheduled email deletions of the invention. Optionally, the client system 10 includes other application programs 16, such as a "personal information manager" 22 with which the email client program 18 interoperates to schedule event-based email deletions in accordance with the invention. The personal information manager program 22 includes a task organizer (i.e., "To Do" items) module 24 and a calendar module 26 by which a user can define and schedule tasks and appointments. Although shown to be separate application programs, the email client program 18 and personal information manager 22 can be integrated in a single application program.

The email client program 18 and performance information manager 22 execute within an operating system 28. Examples of operating systems supported by the client system 10 include Windows 3.x, Windows 95, Windows 98, Windows NT 3.51, Windows NT 4.0, Windows XP, Windows CE, Macintosh, Java, LINUX, and UNIX. The client system 10 also includes a network interface 30 for communicating over a network 32. The network 32 can be a local-area network (LAN), a metro-area network (MAN), or wide-area network (WAN), such as the Internet or World Wide Web. Users of the client system 10 can connect to the network 32 through one of a variety of connections, such as standard telephone lines, LAN or WAN links (e.g., T1, T3), broadband connections (Frame Relay, ATM), and wireless connections (e.g., 802.11 (a), 802.11(b), 802.11(g)). The email client program 18 communicates with an email server 40 located on the network 32 through the network interface 30, to exchange email messages with other users connected to the network 32.

Figure 2:
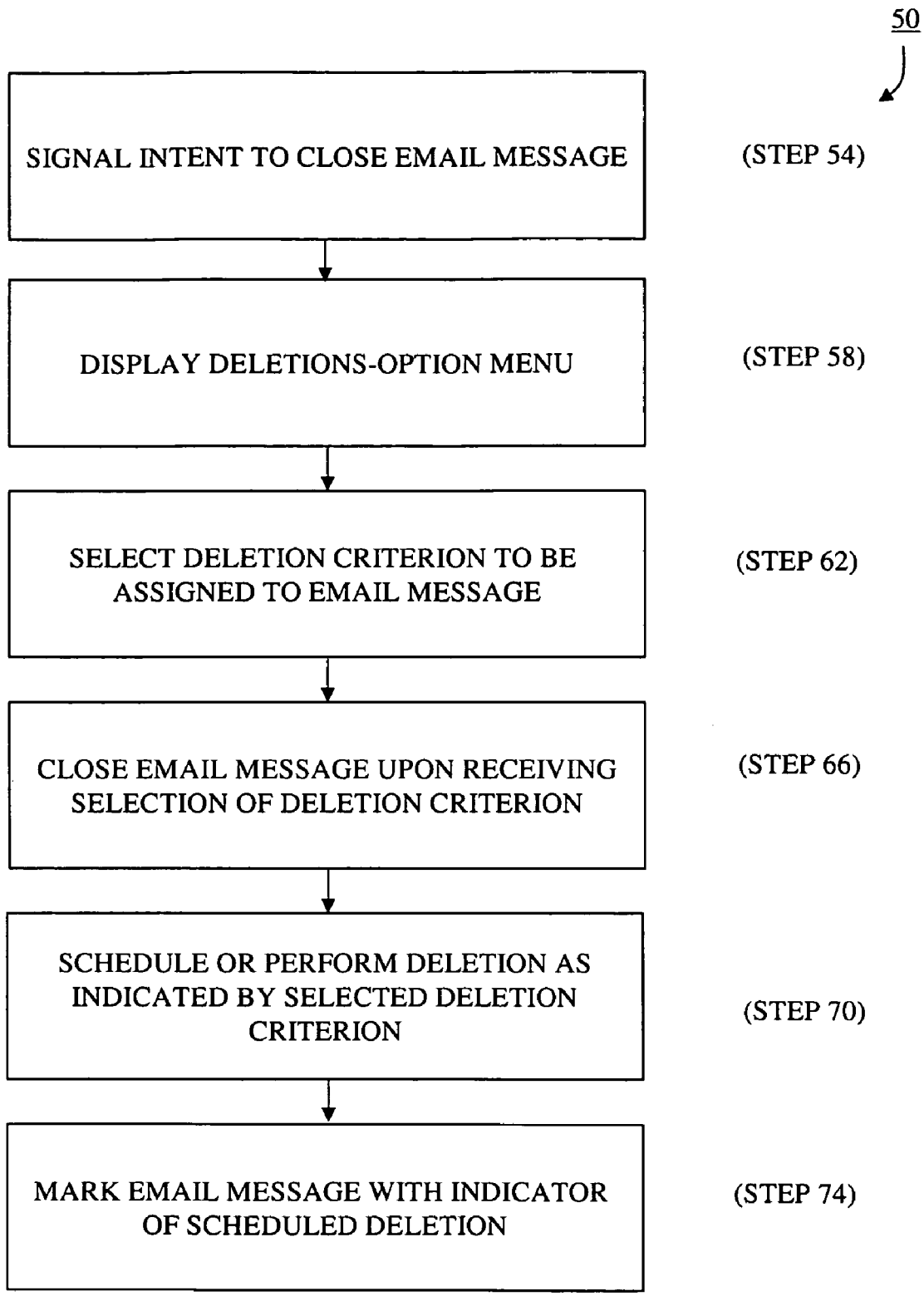
FIG. 2 is a flow diagram of an embodiment of a process for scheduling automatic deletion of a received email message.

FIG. 2 shows an embodiment of a process 50 for scheduling time-based deletions of email messages in an email account in accordance with the invention. Consider that the user is currently running the email client program 18 on the client system 10, has received a new email message, and opened it to read its contents. The email client program 18 accordingly displays the new email message on a display screen of the client system 10 within a graphical window. At step 54, the user signals intent to close the email message by activating a "close" button located at the window's edge. In response to this signal to close the email message, the email client program 18 displays (step 58) a deletion-options menu on the display screen. The deletion-options menu lists various deletion criteria from which the user is required to make a selection to complete the process of closing the email message.

The user then selects (step 62) a particular deletion criterion to assign to the email message. The manner of making the selection depends upon the technology of the client system 10. For example, the user can click the desired selection (e.g., for a mouse, trackball, or touch-pad input device), type a character associated with the selection (e.g., for a keypad or keyboard), or press the selection on the display screen (e.g., with a stylus). Execution of the user's selection results in closing (step 66) the email message, and scheduling or performing immediately (step 70) the deletion of the email mail message in accordance with the user's selection. Optionally, in the inbox of the user's mailbox view, when the email message is not deleted immediately, an indicator also appears (step 74) adjacent to the email message to indicate the scheduled deletion. One technique useful for implementing single selection deletion-option menus of the invention is described in U.S. patent application Ser. No. 09/992,236, filed Nov. 6, 2001, titled "Method and Apparatus for Single Selection Evaluations in Interactive Systems," the entirety of which is incorporated by reference herein.

Figure 3:
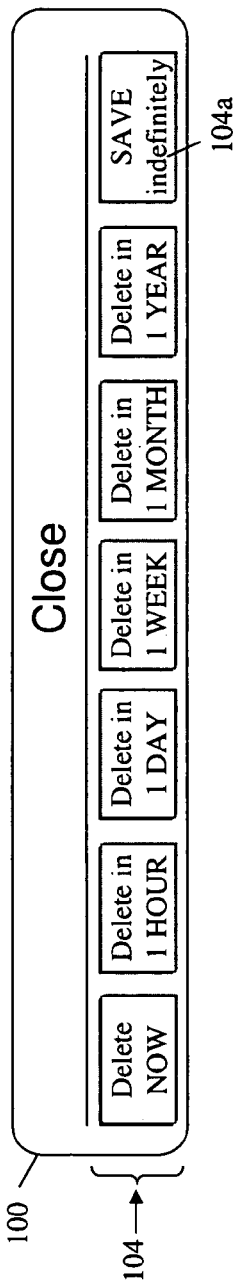
FIG. 3 is an illustration of a one-click deletion menu for assigning a deletion criterion to a received email message.

FIG. 3 shows an example of a deletion-options menu 100 presented to the user for closing a received email message. The deletion-options menu 100 includes a plurality of deletion-criterion buttons 104. Each button 104, except for button 104a, identifies a different expiration period for the email message (e.g., immediate deletion, delete in 1 hour, 1 day, 1 week, and 1 year). The deletion-criterion button 104a indicates to save the email message indefinitely. With the exception of this button 104a, each of the other deletion-criterion buttons establishes a time-based scheduled deletion of the email message. In one embodiment, those deletion-options available to the user are determined by an email retention policy set by the organization for which the user works. For example, the policy can require mandatory expiration periods not to exceed one year. In this instance, the "Save indefinitely" button 104a is not presented as an option. In another embodiment, the user designs the deletion-option menu 100 to satisfy personal email retention practices. Deletion options other than the time-based deletion options shown in FIG. 3 can be used without departing from the principles of the invention. For example, another set of deletion options includes: delete immediately, at the end of the day, at the end of the week, at the end of the month, at the end of the year, or keep indefinitely.

Figure 4:
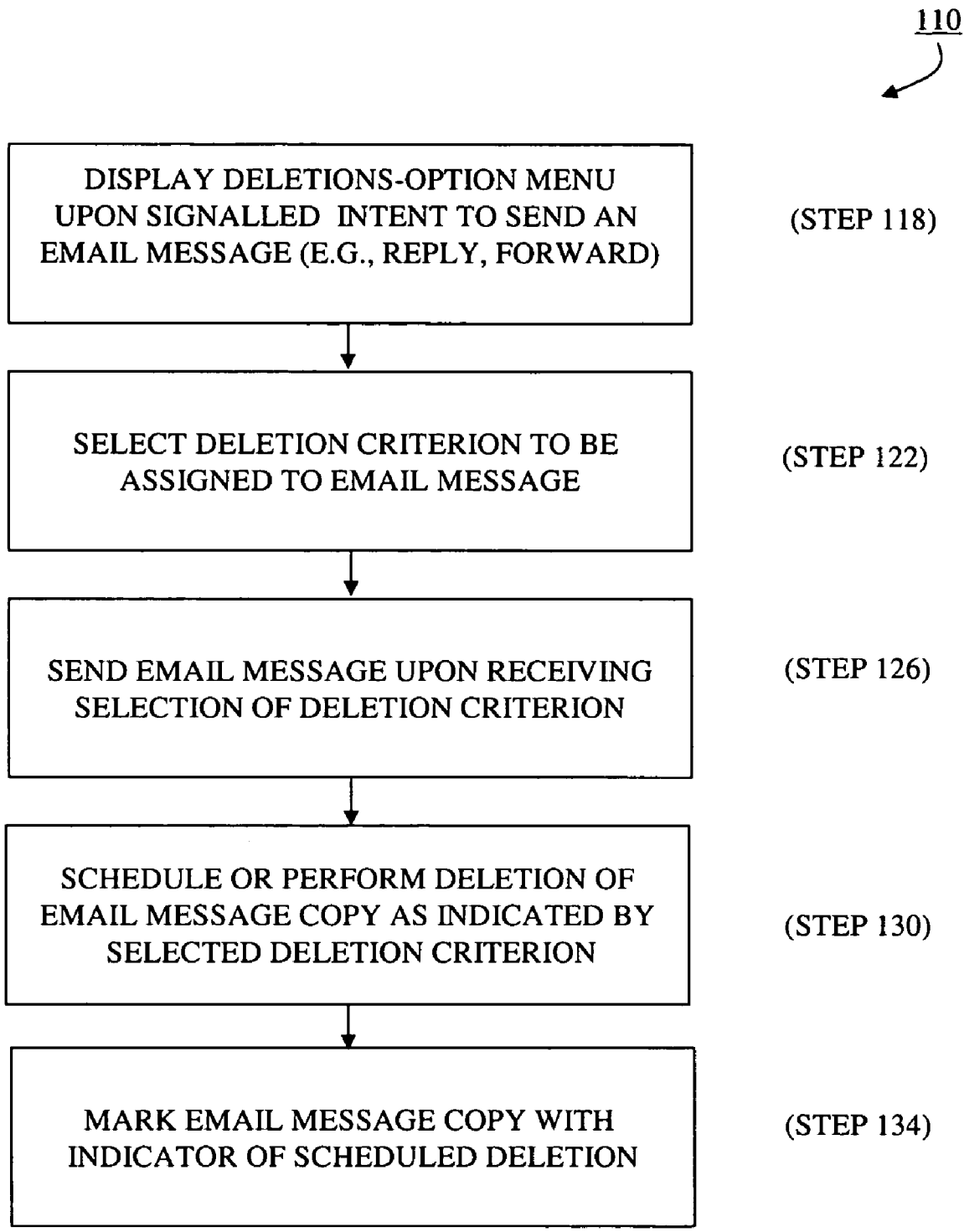
FIG. 4 is a flow diagram of an embodiment of a process for scheduling automatic deletion of an email message to be sent.

Although described above in connection with closing email messages, the principles of the invention apply also to setting a deletion criterion for a self-copy of a "sent" email message. Users commonly configure their email client programs to save a copy in their email account of those email messages that are newly authored, sent in reply, or forwarded. For example, consider that before closing the email message described in FIG. 3, the user desires to draft a reply to the sender of the email message. Referring to FIG. 4, an embodiment of a process 110 for managing a copy of a sent email message includes displaying (step 118) a deletion-options menu on the display screen when the user signals intent to send the email message. The user can signal this intent by activating a "send" button displayed by the email client program 18. This deletion-options menu lists various deletion criteria from which the user is required to make a selection to complete the process of sending the email message. The user selects (step 122) the particular deletion criterion for the email message using a selection technique appropriate for the technology of the client system 10, as described above. This selection causes the email message to be sent (step 126) and the copy of this email message, which remains in the user's email account, to be immediately deleted or scheduled for deletion (step 130). Optionally, in the sent mail folder of the user's email account, when the copy of the sent email message is not deleted immediately, an indicator appears (step 134) adjacent to the email message to indicate the scheduled deletion.

Figure 5:
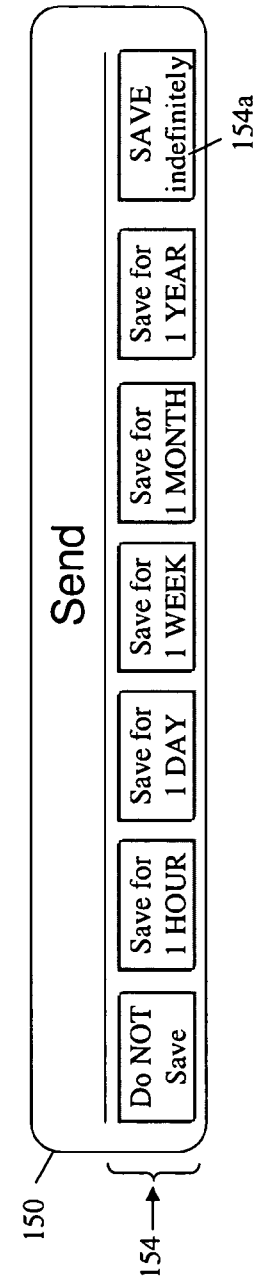
FIG. 5 is an illustration of a one-click deletion menu for assigning a deletion criterion to an email message to be sent.

FIG. 5 shows an embodiment of a deletion-options menu 150 presented to the user for setting a deletion criterion for the self-copy of a sent email message (i.e., a newly authored, reply, or forwarded email message). The deletion-options menu 150 includes a plurality of deletion-criterion buttons 154 that each identify a period for saving a copy of the sent email message in the sender's email account (e.g., do not save, save for 1 hour, 1 day, 1 week, 1 year, and indefinitely). Activating any of the buttons 154 operates to send the email message to its identified recipients. Activation of the selected button 154 also schedules a time-based deletion or performs an immediate deletion of the copy, except for the button 154a, which indicates to save the copy indefinitely.

Figure 6:
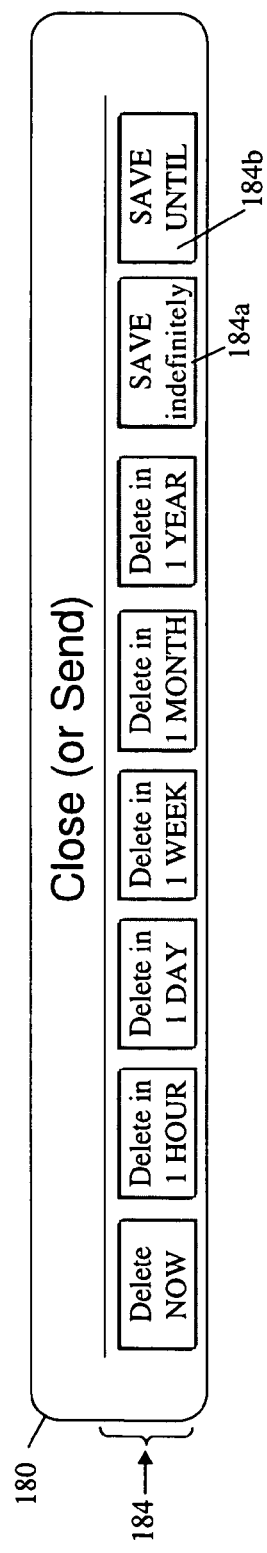
FIG. 6 is an illustration of a one-click deletion menu for linking a deletion criterion for an email message to a scheduled item, such as a task in a "to do" list or a meeting in a "calendar."

Another embodiment of the invention permits the user to associate or link the deletion of an email message to an external object, such as a scheduled item and a file stored on the client system 10. A scheduled item, as used herein, is a scheduled event, such as a task or an appointment. For linking to a scheduled item, the user runs the personal information manager program 22 of FIG. 1 to define and maintain such tasks and appointments. FIG. 6 shows an embodiment of another deletion-options menu 180 that can be presented to the user for linking the deletion of email messages with scheduled items or with stored files. In addition to the same buttons of FIG. 3, here identified as deletion-criterion buttons 184, the deletion-options menu 180 includes a button 184b (labeled "Save Until") for linking the deletion of the email message (or its copy) to a scheduled item. In another embodiment, the user can highlight an email message in a mailbox view and open a drop-down menu on the toolbar that includes an option to link the highlighted email message to an external object.

Figure 7:
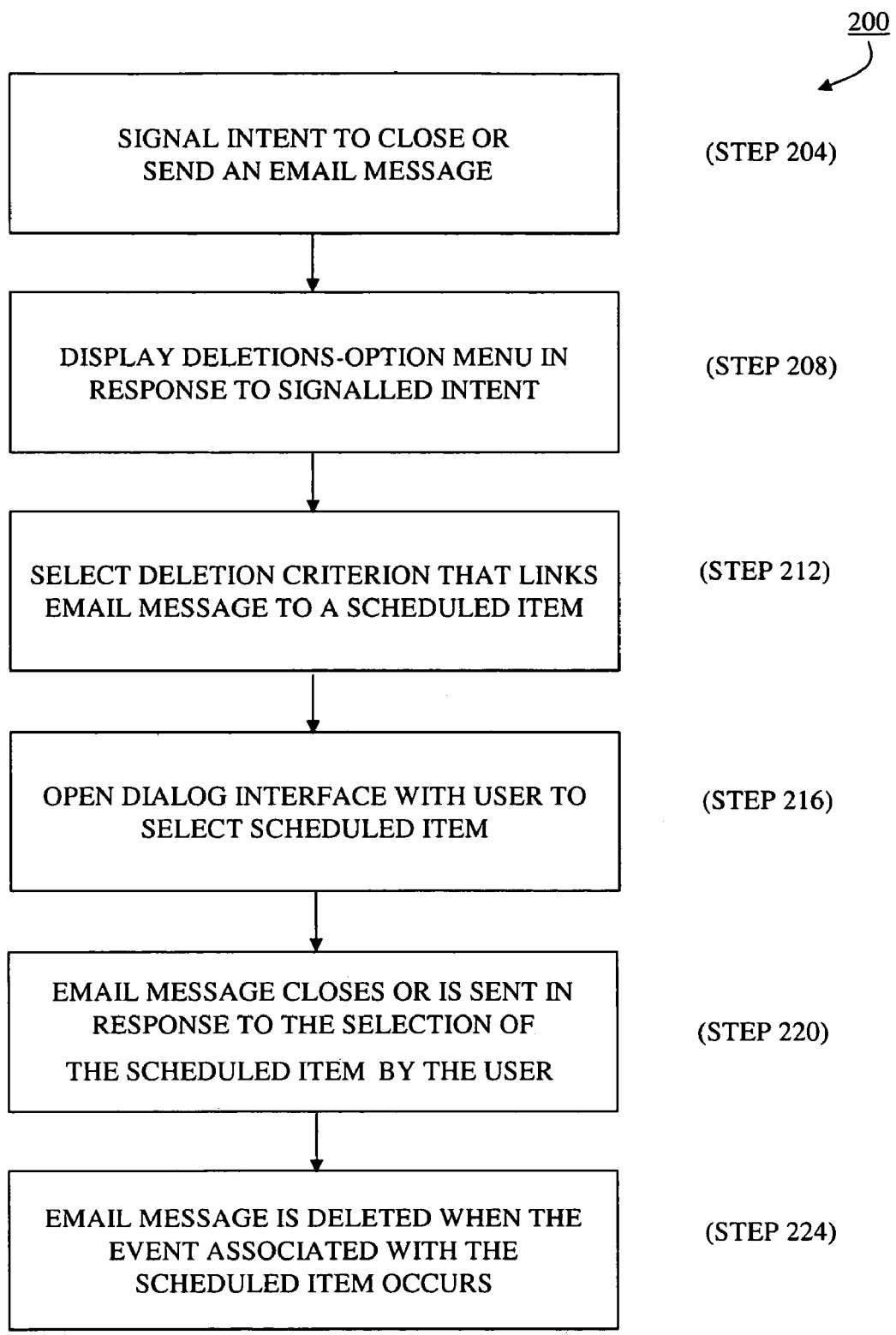
FIG. 7 is a flow diagram of an embodiment of a process for linking deletion of an email to a scheduled item.

FIG. 7 shows an embodiment of a process 200 for linking the deletion of an email message to a scheduled item. When closing a received email message, when forwarding a received email message, or when sending a new or reply email message, the user signals (step 204) intent to close or send the email message. In response, the email client program 18 displays (step 208) the deletion-options menu 180 of FIG. 6, for example. To link deletion of the email message to a scheduled item, the user selects (step 212) the linking button 184b. Activation of this button 184b causes a dialog window to open (step 216), prompting the user to identify the particular scheduled item to which the email message (or its copy) is to be linked. To assist the user in selecting the scheduled item, the dialog window provides searching and browsing capabilities for looking through the possible tasks or appointments. Once the user enters the selected scheduled item, at step 220 the email message closes (for a close operation) or is sent (for a send operation) to its target recipient. Any number of email messages can be linked to the same scheduled item. When the event associated with the scheduled item occurs, e.g., the task is marked completed or the date of the appointment passes, each email message linked to that scheduled item is automatically deleted (step 224).

As a safeguard against unwanted email message deletions, one embodiment of the email client program 18 prompts the user for a confirmation before deleting any automatic time-based or event-based deletions. For example, the email client program 18 can display a dialog window listing each of the email messages that are to be deleted immediately, pending user confirmation. In one embodiment, a checkbox appears adjacent to each deletion candidate. The dialog window also instructs the user to enter a check into the checkbox of each email message that is to be deleted, or, alternatively, that is to be saved from deletion, depending upon the preferred technique for confirming deletion.

Figure 8:
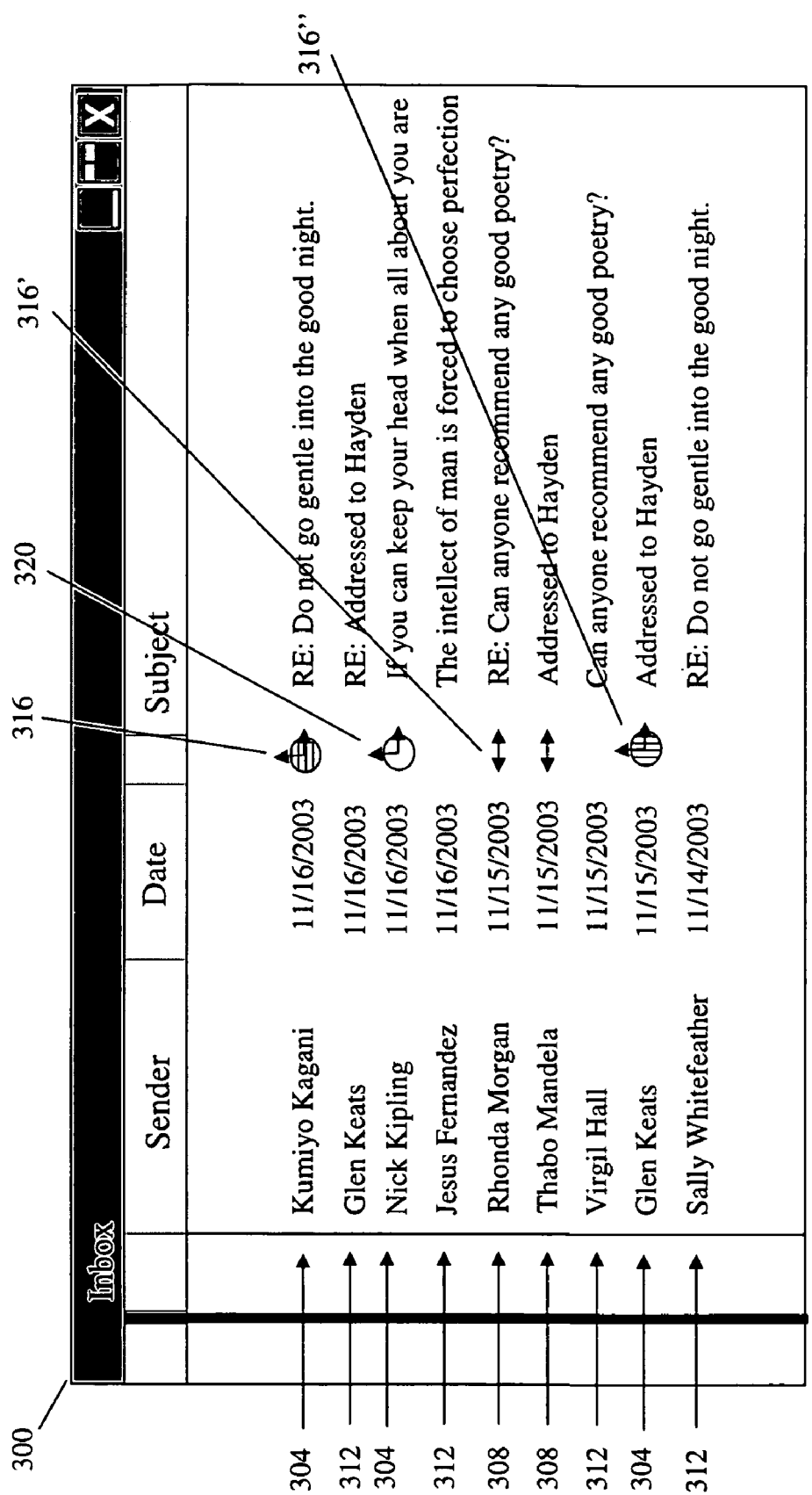
FIG. 8 is a diagram of an example of mailbox view having email messages marked for scheduled deletion in accordance with the invention.

FIG. 8 shows an example of a mailbox view 300 listing a plurality of email messages. (For example, the mailbox view 300 can be of the sent mail folder or of the inbox folder). Some of the email messages (denoted 304) are associated with scheduled time-based deletions, other email messages (denoted 308) are associated with event-based deletions, and other email messages (denoted 312) are unassociated with any scheduled deletions (i.e., to remain in the email account indefinitely until manually deleted by the user). One type of icon 316, here, a timepiece or a clock located adjacent to the subject column of the email message, identifies the email message as being associated with a scheduled time-based deletion. Variations of the icon 316', 316" (e.g., different colors, different shading or different patterns) can indicate the amount of time remaining before the email message is deleted. For example, a red clock can signify that the email message is to expire immediately (i.e., to be deleted upon the next refresh of the email client program 18); an orange clock can signify that the email message is to expire in less than an hour; and a green clock can signify that the email message is scheduled to expire in less than one month. The user can activate the icon (e.g., by double-clicking) to open a dialog window that specifies the scheduled time of deletion and permits the user to modify or remove the expiration date.

Another type of icon 320, here, a double-headed arrow located adjacent to the subject column of the email message, indicates that the email message is associated with an event-based deletion. Optionally, a second icon, such as a clock, appears adjacent the double-headed arrow to indicate when the scheduled event is currently expected to occur. Again, patterns or color can be used to denote the expiration period, for example, a yellow clock to signify that the scheduled event is to occur within a week. Activating this icon opens a dialog window that specifies the scheduled item. The user can open and review the scheduled item, remove the link to this scheduled item, change the link to a different scheduled object, or any combination thereof. Note that if a scheduled item experiences a schedule change, the expiration date of the email message linked to that scheduled item automatically changes. For example, consider an appointment that is changed to occur one week later than originally scheduled. The expiration date of any email message linked to the occurrence of this appointment is automatically extended one week.

Additionally, for a user with visual disabilities, all iconic indicia described above have optional text equivalents (suitable for presentation via text-to-speech technology), which can be used instead of the icons, depending upon the user's settings in a preferences table.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of managing electronic mail (email) messages of an email client running on a client device, the method comprising:
displaying to a user an open email message of the email client on a display screen of the client device;
while displaying the open email message to the user, detecting intent of the user to perform an action that will result in closing the open email message;
presenting to the user, in response to detecting the intent of the user, a plurality of deletion options from which the user makes a selection, a given one of the presented deletion options enabling the user to link deletion of a given email message to an object that is external to the email client;

receiving from the user a selection of the given one of the deletion options and a selection of the external object to which deletion of the given email message is to be linked;

saving the given email message as an undeleted email message of the email client until an event associated with the external object occurs; and automatically deleting the given email message from the email client upon the occurrence of the event.

2. The method of claim 1, wherein the external object is a file stored on the client device.

* * * * *